Patented Sept. 20, 1932

1,877,811

UNITED STATES PATENT OFFICE

STEWART P. COLEMAN, OF HOUSTON, TEXAS, ASSIGNOR TO STANDARD OIL DEVELOPMENT COMPANY, A CORPORATION OF DELAWARE

PROCESS FOR TREATING CRUDE OIL

Application filed April 19, 1928. Serial No. 271,172.

The present invention relates to the art of obtaining valuable products from petroleum and more specifically comprises an improved process for the distillation and separation of petroleum into commercial fractions. My invention will be fully understood from the following description and the drawings which illustrate apparatus for carrying out the process.

Figure 1:
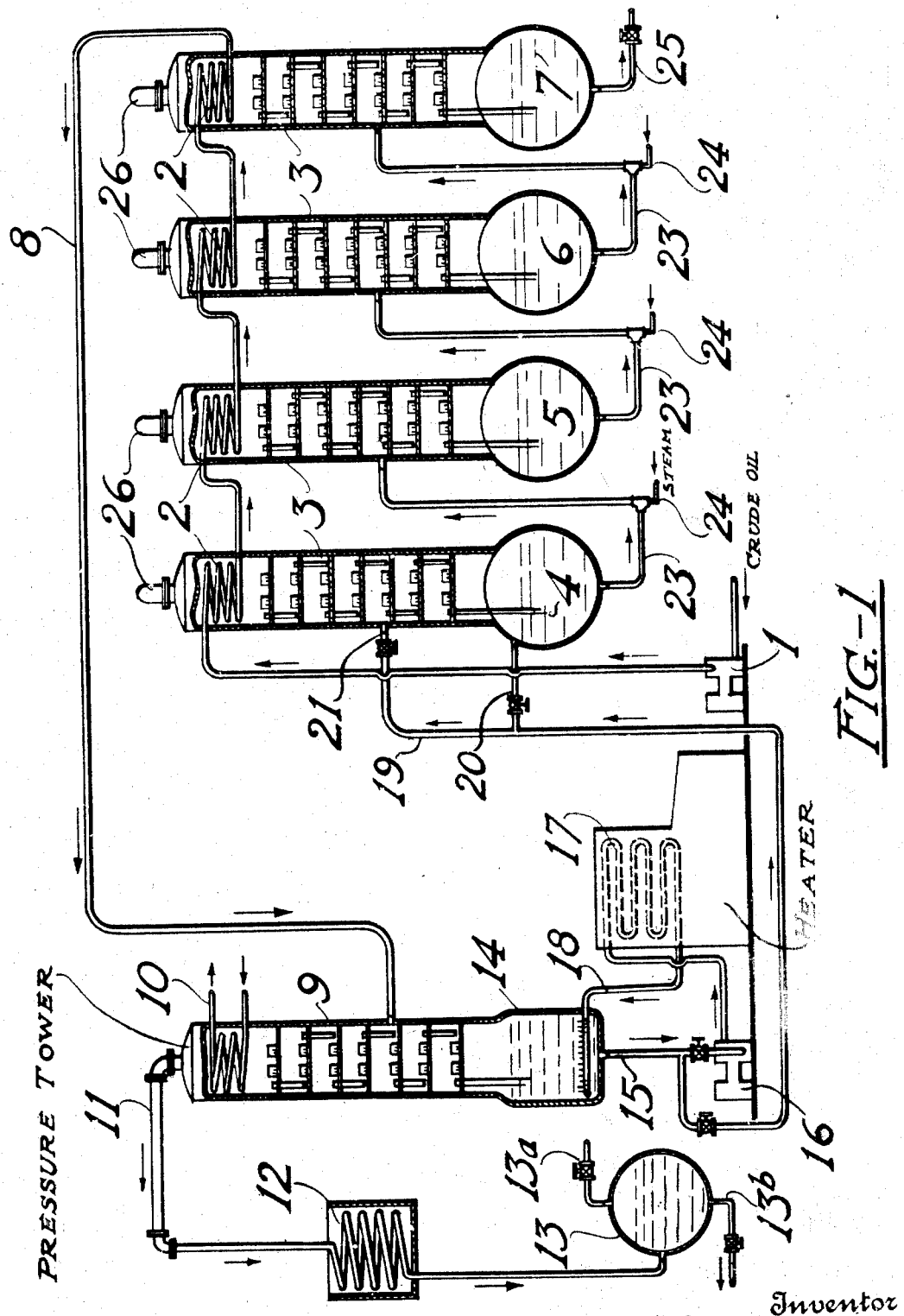

In the drawings, Fig. 1 is a semi-diagrammatic drawing in elevation of an apparatus constructed according to my invention and indicates the flow of oil.

Figure 2:
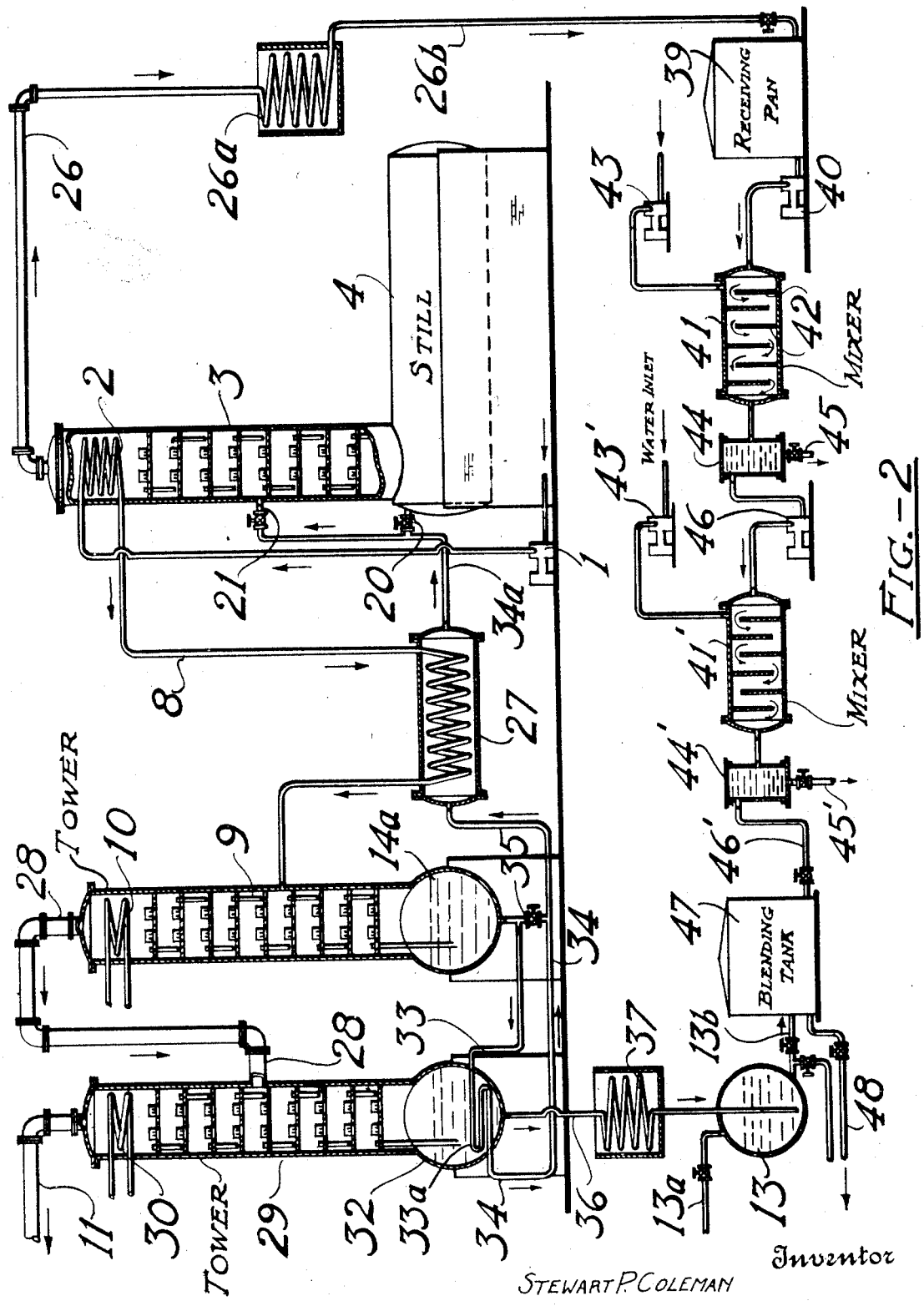

Fig. 2 is a semi-diagrammatic drawing in elevation of a modification of the apparatus, showing also semi-diagrammatically means for purification of the oil and subsequent blending.

In the distillation of crude oil, a large volume of gas is evolved with the oil vapors and on condensation of the vapor in the worms, gas is withdrawn, saturated with gasoline. It is customary to recover the gasoline held by the gas either by compression and cooling or by absorption or adsorption, as is well known. These recovery processes are expensive and among the advantages of my invention, the elimination of recovery is to be noted. Other advantages will be apparent to those skilled in the art.

Referring to the drawings, Fig. 1, a plurality of stills are shown arranged in a battery such as is customary for the distillation of crude oil. Four stills, 4, 5, 6, and 7 are shown and each is surmounted by a tower 3, which may be of any preferred design but is preferably of the bubble cap plate type. For skimming crude oil, a single still or perhaps two or three only is desirable, but if the crude is to be run to a low gravity pitch bottoms, a greater number, say ten or twelve, may be advantageously employed. Crude oil is forced by a feed pump 1 under pressure through coils 2 which are located in the upper portions of the towers 3. Preheated oil is collected in line 8 and is discharged into a pressure tower 9 at an intermediate point between the top and bottom. A cooling coil 10 is provided in the upper portion of tower 9, which may be a bubble cap tower similar to towers 3, except built to stand pressure of 100 to 300 pounds per square inch. Vapor line 11 communicates with a worm 12 and condensate flows therefrom to a pressure storage tank 13, which is provided with a vent pipe 13a and liquid discharge line 13b.

Tower 9 is enlarged at its base as indicated at 14, and a line 15 is provided for withdrawal of oil, a part of which is forced by pump 16 through heater 17 and back to 14 by line 18. The remainder of the oil flows through pipe 19 and is discharged into still 4 through pipe 20 or into tower 3 of still 4 by line 21. Bottoms from each still is conducted to the tower of the next succeeding still by flow line 23. Pumps may be provided for this purpose but it is preferable to move the oil by injection of steam into the flow line as at 24. The final residuum from the last still 7 is conducted to storage (not shown) by line 25. Each tower is fitted with a vapor line 26, which conducts the oil vaporized in each still to a separate worm (not shown), and then to storage, as is the usual practice.

In Fig. 2, a single crude still is shown in side elevation and the crude oil, preheated by passage through coils 2, is conducted by line 8 to a heat exchanger 27 before discharge into tower 9. The tower is mounted on a still 14a which may be directly heated and is fitted with partial condenser 10, as before. The vapor from tower 9 is conducted by vapor line 28 to an intermediate point of a secondary tower 29, which is preferably of the bell cap type and is fitted with a cooling coil 30 in its upper portion. A vapor line 11 conducts vapor from the top of tower 29 and at its lower end, tower 29 is enlarged into a still 32 in which a coil 33a is disposed. Bottoms from still 14a may be conveniently used to heat still 32, and coil 33a is connected by pipe 33 so that the hot oil may flow therethrough and finally by line 34 to heat exchanger 27. From the heat exchanger the oil flows as before to the crude battery by line 34a and is discharged into still 4 by line 20, or into tower 3 by line 21. Bottoms from the secondary still 32 is withdrawn by line 36 through cooler 37 and to pressure storage 13 as in Fig. 1.

Vapors from the tower 3 are conducted by vapor line 26 to worm 26a and after condensation the distillate is led by 26b to a receiving pan 39. Pump 40 takes oil from the pan and forces it through a mixer 41 which is fitted with baffles 42 to provide a tortuous path. Caustic soda, or any other liquid treating agent such as sulphuric acid or "doctor" solution, may be used in place of the soda, depending on the particular oil treated, as will be familiar to those skilled in the art. The mixture of oil and treating agent is allowed to separate in settling chamber 44, spent soda being discarded by pipe 45. Pump 46 forces the oil through a second mixer 41' similar to the first and water may be added by pump 43'. The mixture is again settled in 44' and water discarded by line 45' while oil is led to blending tank 47 by pipe 46'. A part or all of the light distillate collected in pressure tank 13 may also be admitted to tank 47 by line 13b and the blend led to storage by line 48.

It will be readily understood that other treating systems may be used, whether continuous or batch, and if two or more treating agents, such as sulphuric acid and soda are used, mixers similar to 41 may be used for each treating agent. It may be desirable to redistill the treated oil before blending, as is well known in the art.

In the operation of my process, crude oil is preheated under pressure and discharged into tower 9 which is maintained at pressure above 25 pounds per square inch but preferably between 50 and 250 pounds per square inch. The exact conditions of pressure and temperature will vary somewhat according to the particular crude and the result desired, as will be discussed below. The oil is preferably heated from 250 to 375° F. before discharge into tower 9 and temperature in the still 14a or the enlarged portion 14 of tower 9 is generally about 50° F. more or less above the feed temperature. Cooling water is preferably circulated through coil 10 although other cooling media might be used and temperature and quantity are suitably adjusted for holding the vapor temperature at about 150° F., although this temperature will depend on the pressure maintained, as will be understood.

In tower 9 fixed gases are substantially completely rectified from the crude and the product flowing from the base of the tower is forwarded to the crude stills. On distillation, gasoline and kerosene may be removed and condensed in the usual manner but without losses due to gas saturated with gasoline. No gas, or substantially none, will be evolved, except for a relatively small quantity of cracked gas from the last few stills of the battery.

The apparatus, as illustrated in Fig. 1, is adapted to rectify the crude and to produce a stripped crude of low vapor pressure containing substantially no butane and if desired, pentane can also be included in the distillate which is condensed and collected in the pressure receiver 13. Pressure above 50 pounds per square inch is preferable so that butane in the distillate may be condensed with ordinary cooling water. This distillate may be used for any purpose desired but it is preferred to blend a part or all of it with gasoline fractions of the crude oil after such fractions have received whatever purification treatment may be required, such as treatment with sulphuric acid, alkali, or "doctor" solutions or any other treatment known to the petroleum industry.

In Fig. 2 the apparatus is adapted to rectify the crude and to produce an intermediate fraction at line 36, which comprises the light liquid or liquefiable hydrocarbons, such as butane and pentane, although I prefer to obtain substantially pure butane. In this modification of my invention, vapors leaving the system by line 11 are substantially free of butane and heavier hydrocarbons, and may be led directly to burners for use as fuel or otherwise. In this case, where separation between butane and propane is intended, I prefer to operate at pressure higher than that required in the modification illustrated by Fig. 1, for example between 125–250 pounds per square inch. Temperature of the still 14a will be higher than in the case illustrated by Fig. 1 but should not go into the range where substantial cracking occurs. Butane produced is preferably added to the gasoline fractions after the latter have been treated and may be added in whatever proportion may be desirable.

The crude still battery is operated in the usual manner well known in the art. The temperature of the stills varies from about 350° or 400° F. in the first to from 690° to 695° in the last, in which heavy oil is being distilled to pitch bottoms. The crude stills are maintained at substantially atmospheric pressure, and under certain circumstances, it is desirable to cool the hot oil from the pressure tower 9, as in coil 33a and heat exchanger 27, before discharge into tower 3 at atmospheric pressure. After passage through the pressure towers, it is found that the vapor pressure of the crude is much reduced, for example to 50 to 75 mm. at 75° F. and distillates, being free from dissolved gas, show little loss by evaporation in subsequent treating operations.

My invention finds particular application to light crude in which a large amount of gas is present although it is applicable and useful in distilling any crude oil or cut therefrom which contains gas and gasoline, such as pressure distillate or cracking coil distillate.

My invention is not to be limited by any theory of the mechanism of the process nor by any example given merely by way of illustration but only by the attached claims in which I wish to claim all novelty inherent in the invention.

I claim:

1. Improved process for obtaining valuable products from crude oil which comprises continuously preheating the crude under superatmospheric pressure, rectifying the crude under said pressure and at temperature at which no substantial cracking takes place to produce a liquid distillate comprising butane and a residue substantially free of butane, and continuously distilling the residue under substantially atmospheric pressure.

2. Process according to claim 1 in which the crude is rectified under a pressure of from 25 to 250 pounds per square inch.

3. Process according to claim 1 in which the crude is rectified under a pressure of from 50 to 250 pounds per square inch.

4. Process according to claim 1 in which the crude is rectified under pressure of from 25 to 250 pounds per square inch and at a temperature of from 250 to 375° F.

5. Process according to claim 1 in which the crude is rectified under a pressure of from 50 to 250 pounds per square inch and at a temperature of from 250 to 375° F.

6. Process according to claim 1 in which the crude is rectified under a pressure of 125 to 250 pounds per square inch.

7. Process according to claim 1 in which distillate resulting from the distillation under atmospheric pressure is blended with a portion of the liquid distillate comprising butane.

8. An improved process for obtaining valuable products from crude oil, comprising preheating the crude under pressure between 125 and 250 pounds per square inch, discharging said crude into an intermediate zone of a first series of rectification zones and rectifying the crude therein under full pressure and at a temperature at which no substantial cracking takes place to produce vapors comprising butane and a liquid residue, passing the vapors to an intermediate zone of a second series of rectification zones under the same pressure and rectifying the vapors therein at temperatures to produce a residual liquid comprising butane, withdrawing the residual liquid from the second series and removing vapors and gases from the second series of rectification zones, withdrawing the liquid residue from the first series of rectification zones, and distilling said residue under atmospheric pressure.

9. Process according to claim 8 in which the temperatures and pressure are so regulated that the vapor removed from the first series of rectification zones is substantially free from pentane and higher hydrocarbons.

10. Process according to claim 8 in which the temperatures and pressure are so regulated that the liquid obtained from the second series of zones is substantially pure butane.

STEWART P. COLEMAN.